United States Patent
Watanabe

(10) Patent No.: US 8,054,390 B2
(45) Date of Patent: *Nov. 8, 2011

(54) TRANSPARENT COORDINATE INPUT DEVICE HAVING A RIDGE PORTION FORMED IN TRANSPARENT RESISTANCE FILM

(75) Inventor: Takeshi Watanabe, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1135 days.

This patent is subject to a terminal disclaimer.

(21) Appl. No.: 10/679,614

(22) Filed: Oct. 6, 2003

(65) Prior Publication Data

US 2004/0075643 A1    Apr. 22, 2004

(30) Foreign Application Priority Data

Oct. 16, 2002 (JP) .................................. 2002-301741
Jun. 6, 2003 (JP) .................................. 2003-162057

(51) Int. Cl.
*G02F 1/1335* (2006.01)

(52) U.S. Cl. .......................................................... 349/12

(58) Field of Classification Search ................. None
See application file for complete search history.

(56) References Cited

U.S. PATENT DOCUMENTS

| | | | | |
|---|---|---|---|---|
| 4,729,640 A | * | 3/1988 | Sakata | 349/201 |
| 5,283,675 A | * | 2/1994 | Ooi et al. | 349/86 |
| 5,999,685 A | * | 12/1999 | Goto et al. | 385/146 |
| 6,335,150 B1 | * | 1/2002 | Tsai | 349/113 |
| 6,689,458 B1 | | 2/2004 | Mikoshiba et al. | |
| 2001/0019379 A1 | * | 9/2001 | Ishihara et al. | 349/65 |
| 2002/0154100 A1 | | 10/2002 | Hatakeda et al. | |

FOREIGN PATENT DOCUMENTS

| | | |
|---|---|---|
| JP | 64-017115 | 1/1989 |
| JP | 2-79530 | 6/1990 |
| JP | 06-043310 | 2/1994 |
| JP | 06-139005 | 5/1994 |
| JP | H07-169367 | 7/1995 |
| JP | 08-281856 | 10/1996 |
| JP | 8-281856 | 10/1996 |
| JP | H8-281856 | 10/1996 |
| JP | 10-3079 | 1/1998 |
| JP | 10-319216 | 12/1998 |
| JP | 11-250764 | 9/1999 |
| JP | H11-250764 | 9/1999 |

(Continued)

OTHER PUBLICATIONS

Machine translation of JP 2000-187197.*

(Continued)

*Primary Examiner* — Lucy Chien
(74) *Attorney, Agent, or Firm* — Brinks Hofer Gilson & Lione

(57) ABSTRACT

A transparent composite material is able to promote visibility in a transparent coordinate input device due to the reflection of display light while the generation of an interference fringe at an input operating time is restrained. Many ridge portions extending in one direction are formed on the surface of a first transparent resistance film. Such ridge portions are projected stripes formed in a triangular shape in section, and are constructed by alternately forming one set of slanting faces on the surface of the first transparent resistance film.

7 Claims, 9 Drawing Sheets

FOREIGN PATENT DOCUMENTS

| | | |
|---|---|---|
| JP | 2000-207127 | 7/2000 |
| JP | 2002-287902 | 10/2002 |
| KR | 2001-010923 | 11/2001 |
| KR | 2002-0072191 | 9/2002 |
| WO | 99/63394 | 12/1999 |

OTHER PUBLICATIONS

European Search Report issued in corresponding European Patent Application No. 03255991.6; mailed Jun. 11, 2008.

Office Action issued in corresponding Taiwanese Patent Application No. 092127984; issued May 25, 2005.

Office Action issued in corresponding Korean Patent Application No. 10-2003-0070154; issued Aug. 19, 2005.

Office Action issued in corresponding Taiwanese Patent Application No. 092127984; issued May 10, 2006.

Office Action issued in corresponding Japanese Patent Application No. 2003-352179; issued Jun. 3, 2008.

Office Action issued in corresponding Japanese Patent Application No. 2003-352179; issued Sep. 18, 2008.

* cited by examiner

TRANSPARENT COORDINATE INPUT DEVICE HAVING A RIDGE PORTION FORMED IN TRANSPARENT RESISTANCE FILM

BACKGROUND OF THE INVENTION

1. Field of the Invention

The present invention relates to a transparent coordinate input device for directly inputting coordinates on a screen, and a transparent composite material constituting this transparent coordinate input device.

2. Description of the Related Art

A portable information terminal represented by PDA generally has a coordinate input device for selecting a menu and inputting data by directly operating the display screen such as a liquid crystal display panel, etc. by a pen, a finger, etc. Such a coordinate input device normally has a transparent coordinate input device formed on the liquid crystal display panel and the data is inputted by indicating the display of the liquid crystal display panel. As is well known, the transparent coordinate input device of a resistance film type particularly widely used among the transparent coordinate input device has a glass plate forming a transparent resistance film called ITO (Indium Tin Oxide) on its surface on the liquid crystal display panel side, and a soft transparent resin film such as PET (polyethylene terephthalate film), etc. forming a similar transparent resistance film on its surface on the operation side. This transparent coordinate input device is a flat panel device made by spacing these two transparent resistance films from each other by an insulating spacer, etc., and oppositely arranging these two transparent resistance films.

When an input operation is performed by pressing the surface of the transparent coordinate input device by a pen or a finger in such a transparent coordinate input device, it is known that the transparent resin film on the operation side is slightly recessed and a rainbow-colored annular interference fringe is generated with the pressing portion as a center. When such an interference fringe is generated, visibility of the liquid crystal display panel is reduced during every operation of the transparent coordinate input device so that it is difficult to perform a smooth and comfortable input operation. Such an interference fringe is particularly notably generated as the size of the transparent coordinate input device is increased. Therefore, an interference fringe countermeasure has been strongly desired due to the increase in the display screen size of the recent portable information terminal.

In consideration of the above present situation, a transparent coordinate input device having many fine projections formed on the surface of the transparent resistance film on the liquid crystal display panel side or the operation side is known as the conventional interference fringe countermeasure in the transparent coordinate input device. In such a transparent coordinate input device, light for illuminating the liquid crystal display panel is diffused in many directions by the fine projections formed on the surface of the transparent resistance film so that the generation of the interference fringe is restrained. (For example, see Patent Literature 1.)

[Patent Literature 1]

Japanese Unexamined Published Patent Application No. H8-281856

However, in the transparent coordinate input device having many fine projections formed on the surface of the transparent resistance film on the liquid crystal display panel side or the operation side as mentioned above, the individual projections respectively play the role of a microscopic lens so that many bright spots are formed by the display light of the liquid crystal display panel. Therefore, a problem exists in that the display is glittered when the liquid crystal display panel is seen from the outside of the transparent coordinate input device. Further, a problem also exists in that the liquid crystal display panel cannot be clearly observed and is defocused by the lens effect of the individual projections. Such glittering and defocusing due to the conventional transparent coordinate input device caused a reduction in the visibility of the liquid crystal display panel.

SUMMARY OF THE INVENTION

In consideration of the above situations, an object of the present invention is to provide a transparent coordinate input device and a transparent composite material able to restrain the reduction in visibility due to the reflection of the display light while the generation of the interference fringe and the defocusing at the input operating time is restrained.

To achieve the above object, the present invention provides a transparent coordinate input device characterized in that the transparent coordinate input device comprises a first transparent base material forming a first transparent resistance film therein, and a second transparent base material facing said first transparent base material with a clearance therebetween and forming a second transparent resistance film therein opposed to said first transparent resistance film, and plural ridge portions are formed at a predetermined pitch in at least one of said first and second transparent resistance films.

In accordance with such a transparent coordinate input device, this ridge portion has a shape longitudinally extending in one direction. Accordingly, no defocusing due to a lens effect is caused and an image can be clearly observed. Further, no irregularities of illuminance due to the lens effect are caused and glittering can be effectively prevented.

Plural projected stripes of a polygonal shape in section constructed by plural faces inclined at angles different from each other are preferably formed at a predetermined pitch in said ridge portions. Such longitudinally extended projected stripes can effectively prevent the generation of the defocusing and the irregularities of illuminance due to the lens effect.

The forming pitch of said ridge portions is preferably set to range from 100 to 5000 μm. The heights of said ridge portions are preferably set to range from 0.1 to 10 μm. When the surfaces of the first and second transparent base materials are pressed, many ridge portions generate very fine interference fringes difficult to be visualized by the eyes of a human being by setting the forming pitch of the ridge portions and the heights of the ridge portions to such ranges. The interference fringe generated in the transparent coordinate input device is finely set to such an extent that no interference fringe can be visualized by sufficiently finely setting the pitch of the ridge portion. Thus, no existence of the interference fringe is apparently almost recognized.

If the above transparent coordinate input device is applied to a liquid crystal display device having a liquid crystal display panel, the visibility of the liquid crystal display device is raised and the input operation can be performed by clear display.

A projected stripe of a polygonal shape in section may be intermittently formed in its extending direction in said ridge portion. Further, said ridge portion may be extended in the direction inclined at a constant angle with respect to each of two perpendicular sides for partitioning a pixel of said liquid crystal display panel. Thus, the generation of the interference fringe of the liquid crystal display device can be prevented.

DESCRIPTION OF THE PREFERRED EMBODIMENTS

Figure 1:
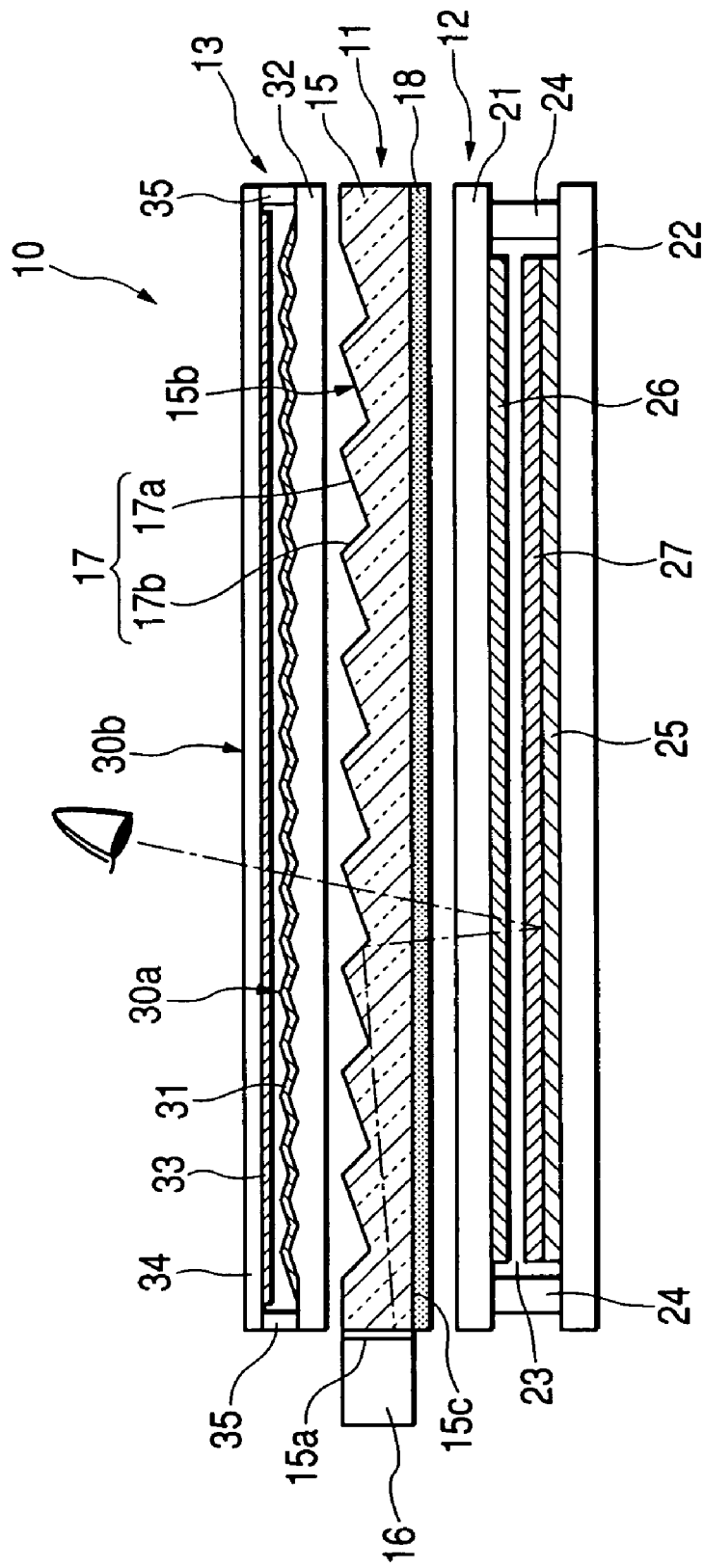
FIG. 1 is a cross-sectional view showing a liquid crystal display device in one embodiment mode of a transparent coordinate input device of the present invention.

A liquid crystal display device having a transparent coordinate input device (transparent coordinate input switch) will next be illustrated with respect to an embodiment mode of the present invention. FIG. 1 is a cross-sectional view of the liquid crystal display device arranging the transparent coordinate input device of the present invention therein. The liquid crystal display device 10 has a front light (illuminating device) 11, a liquid crystal display panel 12 and a transparent coordinate input device 13. The front light 11 is constructed by a light guide plate 15 and a light source 16. An incident face 15a, an observing face 15b and an emitting face 15c are formed in the light guide plate 15.

The light source 16 is a bar-shaped light source arranged along the incident face 15a of the light guide plate 15. Concretely, a light source having a light emitting element such as a white LED (Light Emitting Diode), etc. on one end face or both end faces of a bar-shaped light guide body is suitably used. However, the light source 16 can be used without any problem if light is introduced onto the incident face 15a in the light guide plate 15. The light source 16 can be also constructed by arranging light emitting elements such as LEDs, etc. along the incident face 15a of the light guide plate 15.

Many grooves 17 of a triangular wave shape for changing the light introduced from the light source 16 toward the emitting face 15c are formed on the observing face 15b of the light guide plate 15. The groove 17 formed on the observing face 15b is constructed by a pair of slanting face portions, and one slanting face portion is set to a gentle slanting face portion 17a. The other slanting face portion is set to a reflecting face (steep slanting face portion) 17b formed at an inclination angle steeper than that of the gentle slanting face portion 17a. The shape of this observing face 15b is not limited to the above shape, but may be set to any shape if this shape is a shape able to uniformly guide light introduced from the incident face 15a and propagated within the light guide plate 15 to the emitting face 15c. Further, an AR grating layer 18 providing a reflection-preventing effect is formed on the emitting face 15c of the light guide plate 15.

The liquid crystal display panel 12 is constructed such that a liquid crystal layer 23 is nipped and supported between an upper substrate 21 and a lower substrate 22 oppositely arranged, and is sealed by a sealant 24 arranged in a picture frame shape along the inner face circumferential edge portions of the substrates 21, 22. A liquid crystal control layer 26 is formed on the inner face side (lower substrate 22 side) of the upper substrate 21. A reflecting layer 25 having a metallic thin film for reflecting illumination light and external light of the front light 11 is formed on the inner face side (upper substrate 21 side) of the lower substrate 22. A liquid crystal control layer 27 is formed on this reflecting layer 25. The liquid crystal control layers 26, 27 are constructed by including an electrode for controlling the operation of the liquid crystal layer 23, an orientation film, etc., and also include a semiconductor element for switching this electrode, etc. The liquid crystal control layers 26, 27 may also have a color filter in a certain case.

Figure 2:
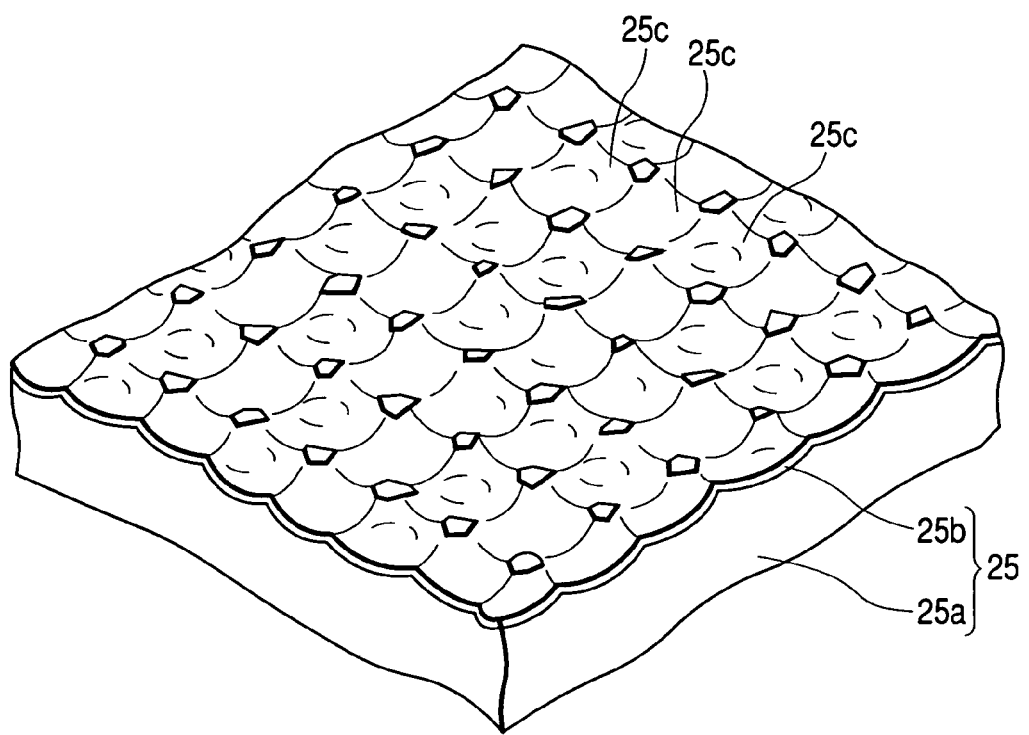
FIG. 2 is an enlarged perspective view showing a reflecting layer of the liquid crystal display device.

The liquid crystal display panel 12 shown in FIG. 1 is set to a reflection type, and the illumination light incident from the front light 11 or the external light incident from the exterior is reflected on the reflecting layer 25 and the displaying operation is performed. As shown in FIG. 2, this reflecting layer 25 is constructed by arranging a reflecting film 25b constructed by a metallic thin film of high reflectivity such as aluminum, silver, etc. and formed on an organic film 25a constructed by acrylic resin, etc. formed in an irregular shape on the surface by a sputtering method, etc. Many concave portions 25c are formed in the reflecting film 25b. Further, a flattened film may be also formed by silicon-based resin, etc. to flatten the irregular shape of the surface on the reflecting film 25b.

A smooth curved surface such as a spherical surface, etc., a shape obtained by combining this curved surface and a plane, etc. can be applied as the shape of the above concave portion 25c. A reflecting layer having appropriate reflecting characteristics can be formed in conformity with the design of an electronic device having the liquid crystal display panel 12 as a display section by adjusting the inclination angle of the inner face and the pitch and the depth of the concave portion. Since the reflecting layer 25 having the surface shape shown in FIG. 2 is arranged, the incident light can be efficiently reflected and the display of higher luminance can be performed. Further, when the incident light is external light, regular reflection of the light is prevented and the display bright and excellent in visibility is obtained. The liquid crystal display panel 12 is not limited to the reflection type, but may be also set to a semi-transmission type and a transmission type except for the reflection type.

With reference to FIG. 1, the transparent coordinate input device 13 is constructed by two transparent composite materials 30a, 30b, and an insulating spacer 35 for separating the transparent composite materials 30a and 30b from each other by constantly holding the distance therebetween. The transparent composite material 30a is constructed by a first transparent base material 32 of a plate shape and a first transparent resistance film 31 covering one face of this first transparent base material 32. The transparent composite material 30b is constructed by a second transparent base material 34 of a plate shape, and a second transparent resistance film 33 covering one face of the second transparent base material 34 so as to be opposed to the first transparent resistance film 31. For example, the first transparent base material 32 may be formed by transparent PC (polycarbonate) resin having 0.5 to 1.5 mm, e.g., about 1 mm in thickness. For example, the first transparent resistance film 31 covering the upper face of the first transparent base material 32 may be formed from a transparent electrically conductive material such as ITO (Indium Tin Oxide), etc. having 0.01 to 0.05 μm, e.g., about 0.02 μm in thickness.

For example, the second transparent base material 34 may be formed from transparent PET (polyethylene terephthalate) resin having about 170 μm in thickness. For example, the second transparent resistance film 33 covering the lower face of the second transparent base material 34 may be formed from a transparent electrically conductive material such as ITO (Indium Tin Oxide), etc. having about 0.02 μm in thickness. The insulating spacer 35 having about 100 μm in thickness is formed between the first transparent base material 32 and the second transparent base material 34 at their circumferential edges so that the first transparent resistance film 31 and the second transparent resistance film 33 are spaced from each other at a constant interval.

Figure 3A:
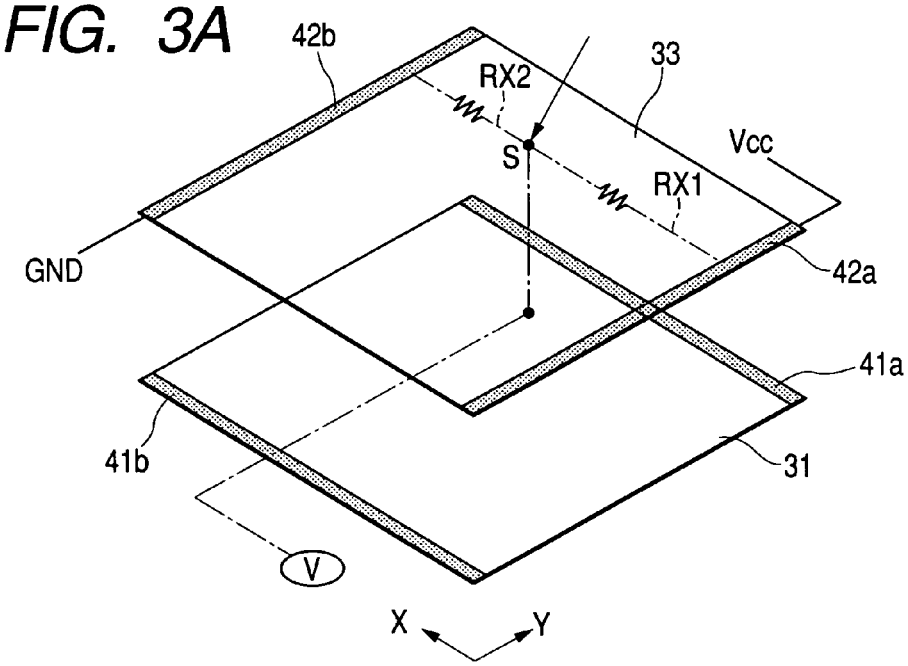
FIG. 3 is an explanatory view showing a mechanism for specifying input coordinates of the transparent coordinate input device.

The operation principle of such a transparent coordinate input device 13 is as follows. As shown in FIG. 3A, one set of electrodes 41a, 41b are formed in both end portions of the first transparent resistance film 31 in the Y-direction in FIG. 3. One set of electrodes 42a, 42b are formed in both end portions of the second transparent resistance film 33 in the X-direction perpendicular 90 degrees to the Y-direction in FIG. 3. Each of the first transparent resistance film 31 and the second transparent resistance film 33 has a uniform resistance value within its surface.

For example, it is now supposed that a point corresponding to reference numeral S in FIG. 3 is selected by pressing the second transparent base material 34 by an indicating member such as a pen, etc. The first transparent resistance film 31 and the second transparent resistance film 33 come in contact with each other at the point S by curving the second transparent base material 34 so that an electrically conductive state is attained. First, in the detection of a coordinate in the X-direction, electric potential gradients are formed in the second transparent resistance film 33 by the voltage applied between the electrodes 42a and 42b of the second transparent resistance film 33 in the X-direction at resistance values RX1, RX2 according to the distance between the point S and the electrode 42a and the distance between the point S and the electrode 42b. The coordinate of the transparent coordinate input device 13 in the X-direction at the point S is detected by taking the electric potential at this point S out of the point S of the first transparent resistance film 31.

Figure 3B:
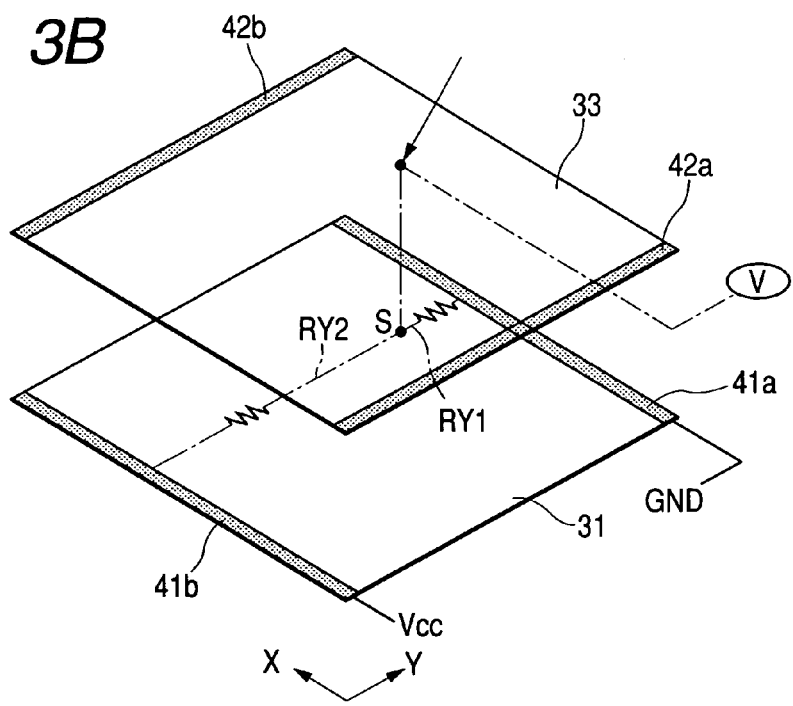

In the detection of a coordinate in the Y-direction, as shown in FIG. 3B, electric potential gradients are formed in the first transparent resistance film 31 by the voltage applied between the electrodes 41a and 41b of the first transparent resistance film 31 in the Y-direction at resistance values RY1, RY2 according to the distance between the point S and the electrode 41a and the distance between the point S and the electrode 41b. The coordinate of the transparent coordinate input device 13 in the Y-direction at the point S is detected by taking the electric potential at this point S out of the point S of the second transparent resistance film 33.

Thus, the two-dimensional coordinate information in the X-direction and the Y-direction at the pressing point S in the transparent coordinate input device 13 is obtained. The transparent coordinate input device 13 of this so-called analog resistance film system has features in that coordinate detection accuracy is improved if the accuracy of an A/D converter is raised. For example, in addition to the analog resistance film system, the coordinate detecting method of the transparent coordinate input device may be also set to a so-called digital detecting system for arranging many microscopic electrodes respectively extending in the X and Y directions in the first transparent resistance film and the second transparent resistance film and detecting the coordinates from the conduction of contact points of these electrodes.

Figure 4:
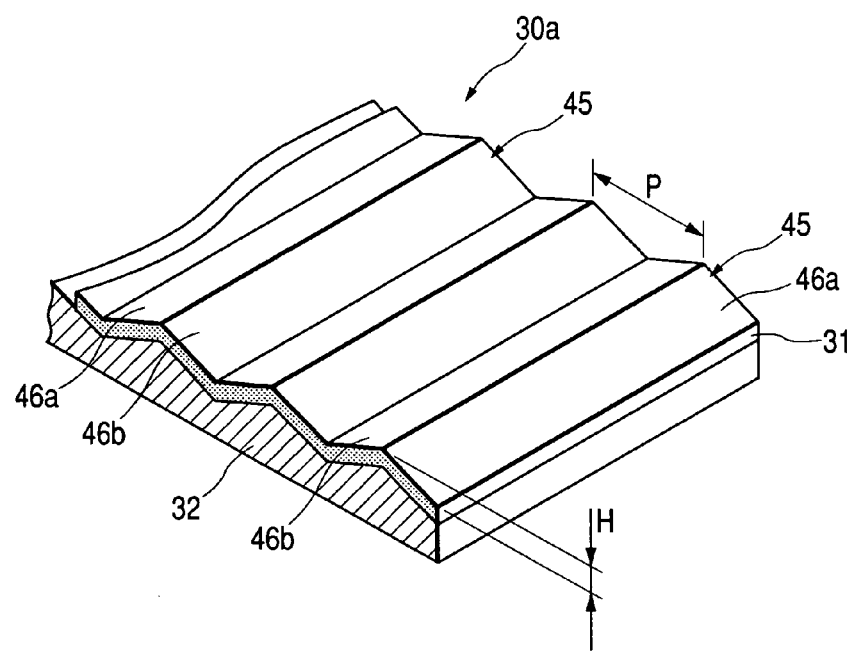
FIG. 4 is an enlarged perspective view showing a transparent composite material of the present invention.

FIG. 4 is an enlarged perspective view showing the transparent composite material 30a. Many ridge portions (stripes) 45 extending in one direction are formed on the surface of the first transparent resistance film 31. Such ridge portions 45 are projected stripes formed in a polygonal shape, e.g., a triangular shape in section, and are constructed such that one set of slanting faces 46a and 46b are alternately formed on the surface of the first transparent resistance film 31.

The ridge portion 45 may be formed in a triangular shape in section having 0.1 to 10 μm, e.g., 3 μm in height H. The ridge portion 45 may be also formed at a pitch P of 100 to 5000 μm, e.g., 1000 μm. If many ridge portions 45 are formed in the first transparent resistance film 31, the surface of the first transparent resistance film 31 is covered with many long thin slanting faces 46a, 46b extending in a constant direction within this surface. The pitch P of the ridge portion 45 may be set at random. For example, the pitch P of the ridge portion 45 may be also changed in an order of 500 μm, 1000 μm, 600 μm and 700 μm.

Figure 5:
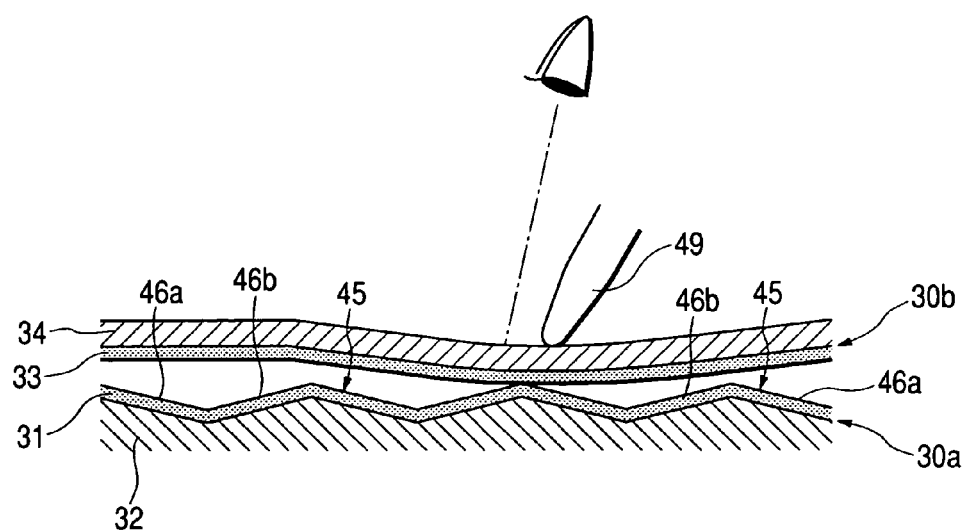
FIG. 5 is a cross-sectional view showing the operation of the transparent coordinate input device of the present invention.

In such many long slanting faces 46a, 46b thin in width, when the surface of the second transparent base material 34 is pressed by the indicating member 49 such as a pen, etc. as shown in FIG. 5, a very thin interference fringe difficult to be visualized by the eyes of a human being is generated on the surface of the first transparent resistance film 31, i.e., on the slanting faces 46a, 46b. The interference fringe generated in the transparent coordinate input device 13 becomes fine to such an extent that this interference fringe cannot be visualized by sufficiently finely setting the pitch P of the ridge portion 45. Thus, no existence of the interference fringe can be apparently almost recognized. One interference fringe is generated every 0.25 μm (half wavelength of light). In accordance with the transparent coordinate input device 13 of the present invention, for example, when the pitch P of the ridge portion 45 is set to 1 mm and the difference in height is set to 2 μm, ten interference fringes are generated within a width of about 500 μm. When ten interference fringes are generated within the width of about 500 μm, it is very difficult to observe these interference fringes by the eyes of a human being. Accordingly, no interference fringes can be actually recognized. Therefore, if the pitch is set to 100 μm smaller than 1 mm, the influence of the interference fringes can be reliably excluded. In contrast to this, when the pitch P of the ridge portion 45 is set to 100 μm or less, it is difficult to precisely form the ridge portion 45. Accordingly, if the pitch P of the ridge portion 45 is set to 100 to 500 µm, the ridge portion 45 can be reliably set such that no existence of the interference fringe is recognized. Further, if the pitch P of the ridge portion 45 is set at random, the interference fringes of various sizes very difficult to be observed by the eyes of a human being are formed so that the influence of the interference fringes can be further reliably excluded.

On the other hand, in the transparent coordinate input device 13 of the present invention, since the slanting faces 46a, 46b fine in width are faces longitudinally extending in one direction, there is no case in which a microscopic lens for focusing and forming an image at one point is formed. Each of many fine projections in the conventional case forms a microscopic lens and causes many bright spots so that irregularities are caused in the illuminance of illumination light and glittering is caused. However, such a microscopic lens is not caused in the transparent coordinate input device 13 of the present invention in which many ridge portions 45 longitudinally extending in one direction are formed on the surface of the first transparent resistance film 31. Further, each of the conventional many fine projections forms the microscopic lens and causes defocusing. However, such defocusing is prevented and a clear image can be observed in the transparent coordinate input device 13 of the present invention in which the ridge portions 45 longitudinally extending in one direction are formed.

As mentioned above, when an object, etc. displayed in the liquid crystal display panel 12 are indicated by the indicating member 49 in the transparent coordinate input device 13 of the present invention, the first transparent resistance film 31 and the second transparent resistance film 33 come in contact with each other at one point and are conducted. In this case, the second transparent base material 34 is flexed downward, and an interference fringe is generated. However, the generated interference fringe can be finely set to such an extent that no interference fringe can be recognized by the eyes of a human being by the slanting faces 46a, 46b constituting the fine ridge portions 45 longitudinally extending in one direction. Accordingly, the object displayed in the liquid crystal display panel 12 can be clearly observed through the transparent coordinate input device 13 without preventing the object from being observed by the interference fringe. Further, since the slanting faces 46a, 46b constituting the ridge portion 45 are faces longitudinally extending in one direction, the generation of bright spots and defocusing due to the microscopic lens effect are restrained and no irregularities are caused in the illuminance of the illumination light. Further, it is possible to observe the liquid crystal display panel 12 with clear image quality having no glittering and no defocusing.

When the ridge portion 45 is formed, transparent resin constituting the first transparent base material 32 is injection-molded by using a die in which the outer shape of the ridge portion 45 is bored in advance. If the first transparent resistance film 31 constructed by the ITO is formed in the first transparent base material 32 having the ridge portion on the surface of this transparent resin, the transparent composite material 30a having many ridge portions 45 on the surface of the first transparent resistance film 31 can be obtained. Further, many fine ridge portions extending in one direction may be also formed by flatly forming the surface of the first transparent base material, and thickly forming the first transparent resistance film on this flat first transparent base material, and deleting the first transparent resistance film by a technique such as etching, etc.

Figure 6:
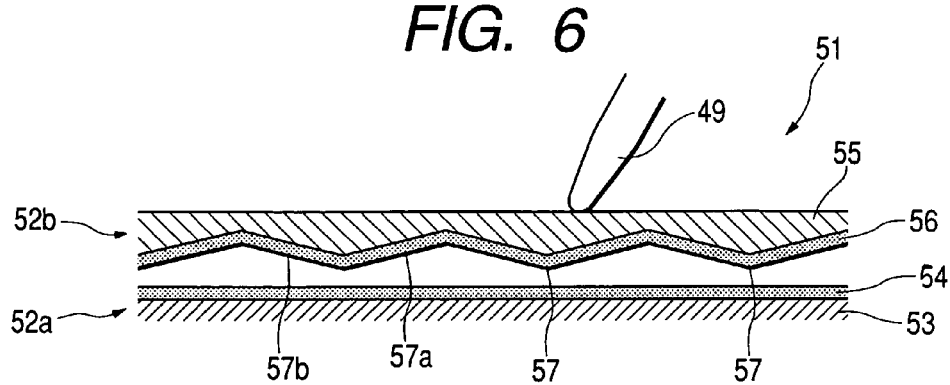
FIG. 6 is a cross-sectional view showing another embodiment mode of the transparent coordinate input device of the present invention.

The ridge portion for setting the interference fringe not to be visualized may be also formed on the transparent composite material side as the operation side of the transparent coordinate input device. As shown in FIG. 6, a transparent coordinate input device 51 has two transparent composite materials 52a, 52b. The transparent composite material 52a is constructed by a first transparent base material 53 and a first transparent resistance film 54. The transparent composite material 52b is constructed by a second transparent base material 55 and a second transparent resistance film 56. Many fine ridge portions 57 extending in one direction are formed on the surface of the second transparent resistance film 56 of the transparent composite material 52b directly pressed by the indicating member 49, etc. Such ridge portions 57 may be formed by projected stripes having a triangular shape in section and constructed by many long slanting faces 57a, 57b thin in width.

The ridge portion 57 causes a very fine interference fringe difficult to be visualized by the eyes of a human being on the surface of the second transparent resistance film 56, i.e., on the slanting faces 57a, 57b when the surface of the second transparent base material 55 is pressed by the indicating member 49. The interference fringe generated in the transparent coordinate input device 51 is finely set to such an extent that no interference fringe can be visualized by sufficiently finely setting the pitch of the ridge portion 57. Accordingly, no existence of the interference fringe is apparently almost recognized. Further, since the slanting faces 57a, 57b constituting the ridge portion 57 are faces longitudinally extending in one direction, the generation of bright spots and defocusing due to the microscopic lens effect is restrained and no irregularities are caused in the illuminance of illumination light. Further, glittering and the defocusing can be effectively prevented.

Figure 7:
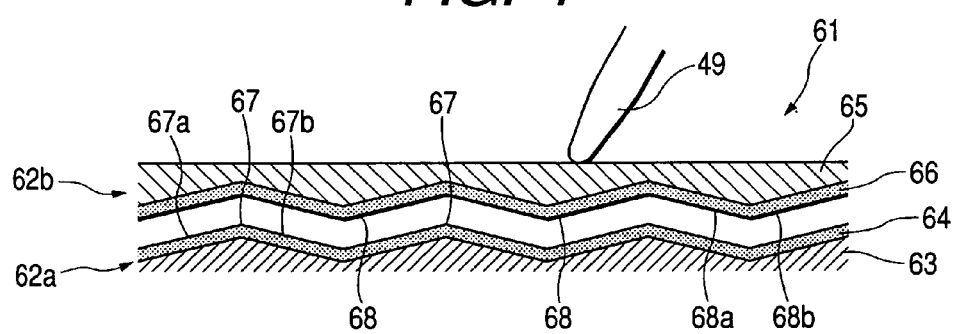
FIG. 7 is a cross-sectional view showing another embodiment mode of the transparent coordinate input device of the present invention.

The ridge portion for setting the interference fringe not to be visualized may be also formed in both transparent composite materials as one set. As shown in FIG. 7, a transparent coordinate input device 61 has two transparent composite materials 62a, 62b. The transparent composite material 62a is constructed by a first transparent base material 63 and a first transparent resistance film 64. The transparent composite material 62b is constructed by a second transparent base material 65 and a second transparent resistance film 66. Many fine ridge portions 67, 68 extending in one direction are respectively formed on the surfaces of the first transparent resistance film 64 and the second transparent resistance film 66 formed in the transparent composite materials 62a, 62b and opposed to each other. Such ridge portions 67, 68 may be set to projected stripes having a triangular shape in section and constructed by many long slanting faces 67a, 67b and many long slanting faces 68a, 68b thin in width.

When the surface of the second transparent base material 65 is pressed by the indicating member 49, the ridge portions 67, 68 generate very fine interference fringes difficult to be visualized by the eyes of a human being on the surfaces of the first transparent resistance film 64 and the second transparent resistance film 66, i.e., on the slanting faces 67a, 67b and the slanting faces 68a, 68b. The interference fringe generated in the transparent coordinate input device 61 is finely set to such an extent that no interference fringe can be visualized by sufficiently finely setting the pitches of the ridge portions 67, 68. Accordingly, no existence of the interference fringe is apparently almost recognized. Further, since the slanting faces 67a, 67b and the slanting faces 68a, 68b constituting the ridge portions 67, 68 are faces longitudinally extending in one direction, the generation of bright spots and defocusing due to the microscopic lens effect is restrained and no irregularities are caused in the illuminance of illumination light. Further, glittering and the defocusing can be effectively prevented.

Figure 8:
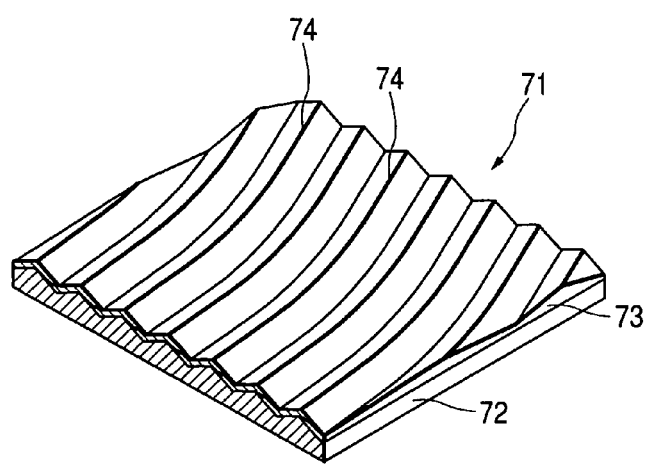
FIG. 8 is an enlarged perspective view showing another embodiment mode of the transparent composite material of the present invention.

The ridge portion for setting the interference fringe not to be visualized may be also formed in a shape extended while being curved. As shown in FIG. 8, a transparent composite material 71 is constructed by a transparent base material 72 and a transparent resistance film 73. Many fine ridges 74 having a triangular shape in section and curvedly extended are formed on the surface of the transparent resistance film 73. Such a ridge portion 74 generates a very fine interference fringe difficult to be visualized by the eyes of a human being. The interference fringe is finely set to such an extent that no interference fringe can be visualized by sufficiently finely setting the forming pitch of the ridge portion 74. Accordingly, no existence of the interference fringe is apparently almost recognized. Further, since the ridge portion 74 is constructed by a fine curved face longitudinally extending in one direction, the generation of bright spots and defocusing due to the microscopic lens effect is restrained and no irregularities are caused in the illuminance of illumination light. Further, glittering and the defocusing can be effectively prevented.

Figure 9:
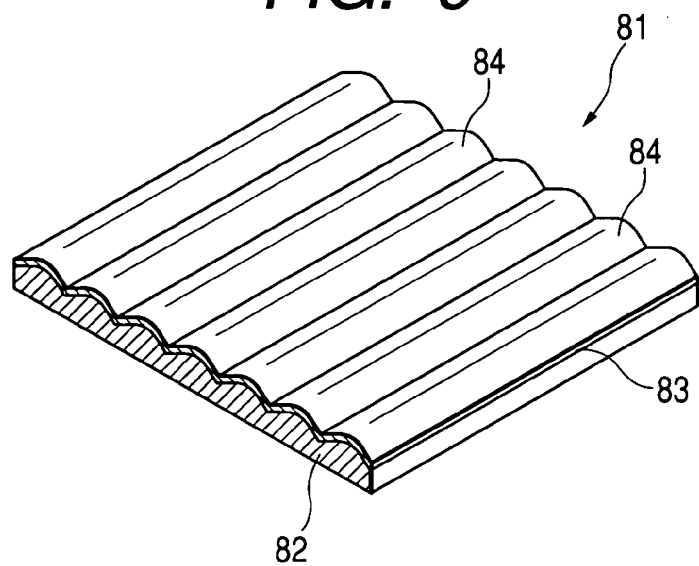
FIG. 9 is an enlarged perspective view showing another embodiment mode of the transparent composite material of the present invention.

The ridge portion for setting the interference fringe not to be visualized may be also set to a curved surface longitudinally extending in one direction and narrow in width. As shown in FIG. 9, a transparent composite material 81 is constructed by a transparent base material 82 and a transparent resistance film 83. Many fine ridge portions 84 constructed by a curved surface of a semi-elliptical shape in section are formed on the surface of the transparent resistance film 83. The interference fringe is finely set to such an extent that no interference fringe can be visualized by sufficiently finely setting the forming pitch of such ridge portions 84. Thus, no existence of the interference fringe can be apparently almost recognized. Further, since the ridge portion 84 is particularly extended in one direction while the ridge portion 84 is curved in this embodiment mode, the generation of the interference fringe can be effectively prevented when this embodiment mode is applied to the liquid crystal display device.

Figure 10:
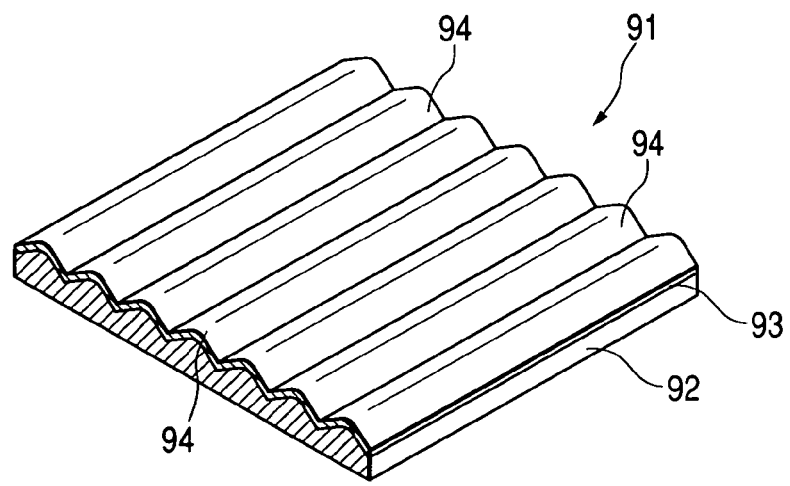
FIG. 10 is an enlarged perspective view showing another embodiment mode of the transparent composite material of the present invention.

The ridge portion for setting the interference fringe not to be visualized may be also set to a curved surface longitudinally extending in one direction and narrow in width. As shown in FIG. 10, a transparent composite material 91 is constructed by a transparent base material 92 and a transparent resistance film 93. Many fine ridge portions 94 having a triangular shape in section and a curved top are formed on the surface of the transparent resistance film 93. Such a ridge portion 94 generates a very fine interference fringe difficult to be visualized by the eyes of a human being. The interference fringe is finely set to such an extent that no interference fringe can be visualized by sufficiently finely setting the forming pitch of the ridge portion 94. Accordingly, no existence of the interference fringe is apparently almost recognized. Further, since the ridge portion 94 is longitudinally extended in one direction, the generation of bright spots and defocusing due to the microscopic lens effect is restrained and no irregularities are caused in the illuminance of illumination light. Further, glittering and the defocusing can be effectively prevented.

Figure 11:
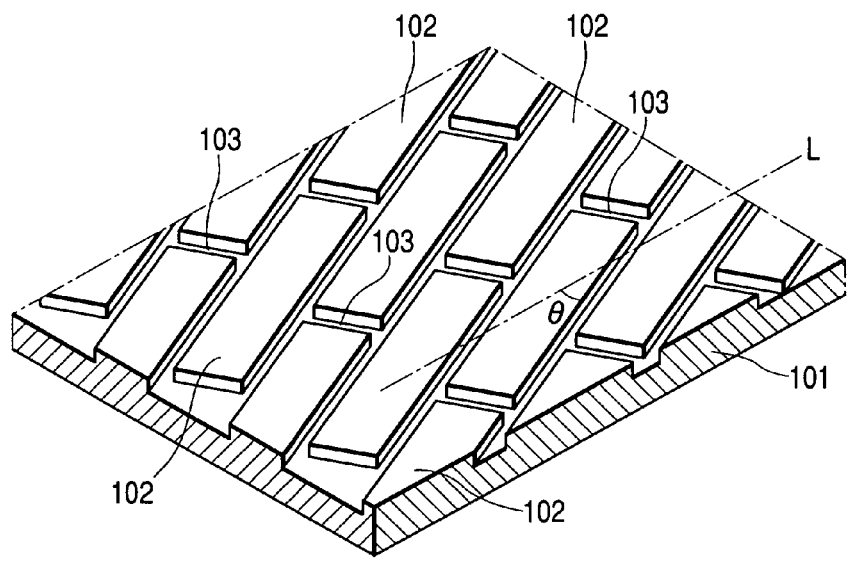
FIG. 11 is a cross-sectional view showing another embodiment mode of the transparent composite material of the present invention.

In the ridge portion for setting the interference fringe not to be visualized, a projected stripe of a rectangular shape in section may be intermittently formed in its extending direction. As shown in FIG. 11, many fine ridge portions 102 of a rectangular shape in section are formed on the surface of a transparent composite material 101. This ridge portion 102 is intermittently formed every constant length in the extending direction of the ridge portion 102 shown by the arrow L in FIG. 11. A fine clearance 103 is formed between the individual ridge portions 102. Further, the ridge portions 102 adjacent to each other in the direction perpendicular to that of the arrow L are formed so as to be shifted from each other every half width of the length of each ridge portion 102 in its extending direction. In such a ridge portion 102, its extending direction L is preferably inclined at a constant angle θ with respect to the extending direction E of an edge constituting a pixel of the liquid crystal display panel.

Figure 12:
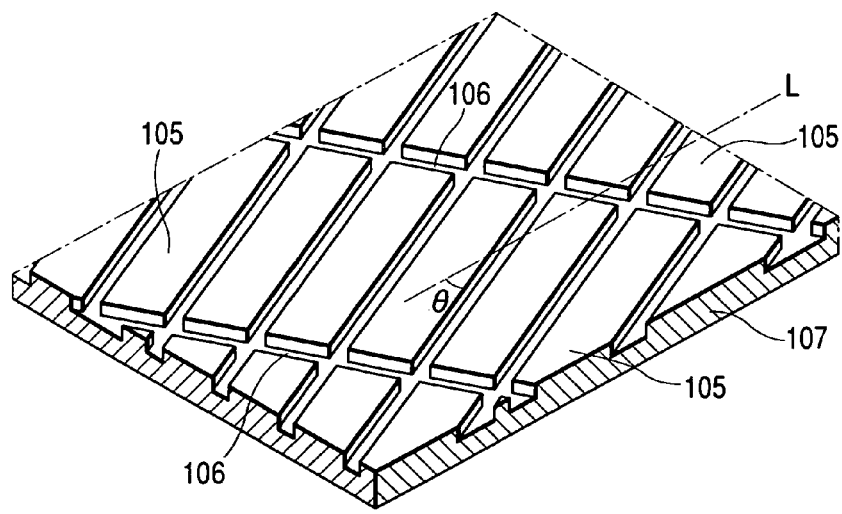
FIG. 12 is an enlarged perspective view showing another embodiment mode of the transparent composite material of the present invention.

The interference fringe generated in such a ridge portion 102 is finely set to such an extent that no interference fringe can be visualized. Accordingly, no existence of the ridge portion is apparently almost recognized. The visualization of the interference fringe can be set to be further impossible by inclining the extending direction L of the ridge portion 102 at the constant angle θ with respect to the extending direction E of the edge constituting the pixel of the liquid crystal display panel. As shown in FIG. 12, a transparent composite material 107 may be also formed such that the clearances 106 between ridge portions 105 adjacent to each other in the direction perpendicular to that of the arrow L are aligned with each other while the ridge portions 105 are intermittently formed every constant length in the extending direction shown by the arrow L in FIG. 12.

Figure 13:
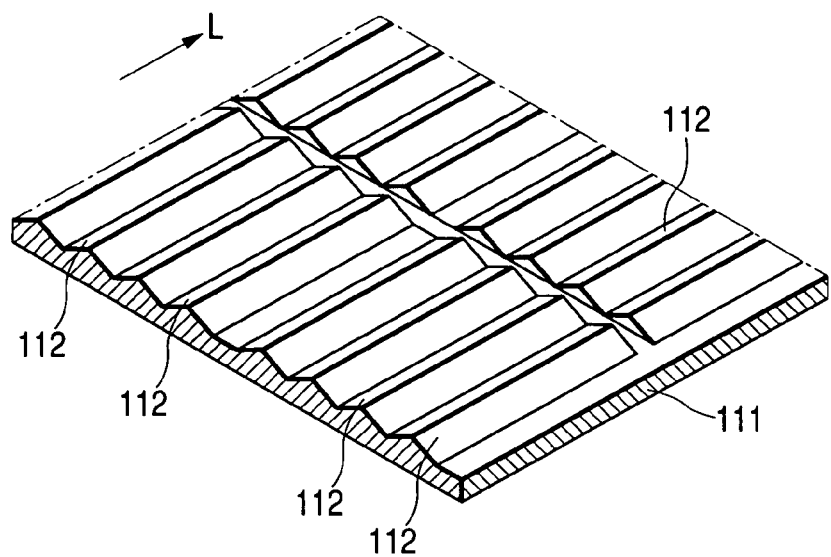
FIG. 13 is an enlarged perspective view showing another embodiment mode of the transparent composite material of the present invention.
Figure 14:
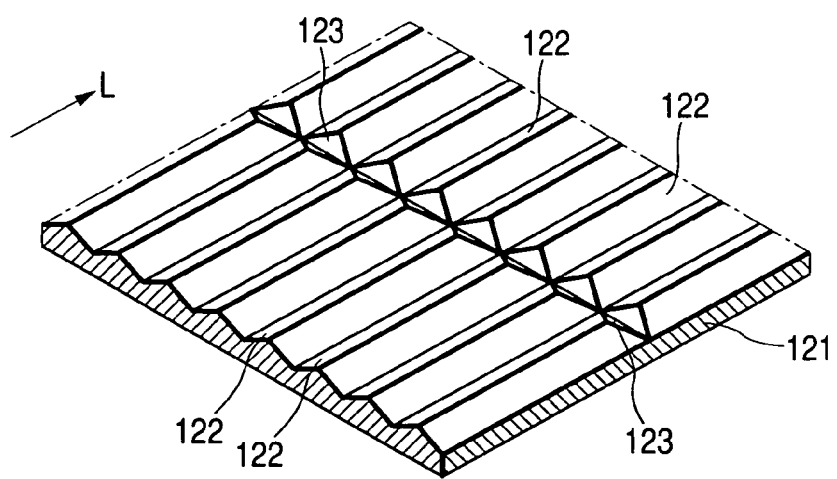
FIG. 14 is an enlarged perspective view showing another embodiment mode of the transparent composite material of the present invention.

As shown in FIG. 13, fine ridge portions 112 of a triangular shape in section may be intermittently formed on the surface of a transparent composite material 111 every constant length in the extending direction shown by the arrow L of FIG. 13. Further, the ridge portions 112 adjacent to each other in the direction perpendicular to that of the arrow L may be also formed collectively every e.g., four ridge portions. Further, as shown in FIG. 14, fine stripes 123 may be also intermittently formed by extending fine ridge portions 122 of a triangular shape in section on the surface of a transparent composite material 121 in the extending direction shown by the arrow L in this figure.

The transparent composite material may be also constructed such that the ridge portion is arranged on the surface of the transparent composite material by forming the ridge portion in the transparent base material constituting the transparent composite material, and forming the transparent resistance film in this transparent base material. Further, the ridge portion may be also arranged on the surface of the transparent composite material by forming the ridge portion in the transparent resistance film itself. Further, the ridge portion may be also arranged on the surface of the transparent composite material by forming an intermediate material in which the ridge portion is formed between the transparent base material and the transparent resistance film. The ridge portion may be also formed at a random pitch.

Figure 15:
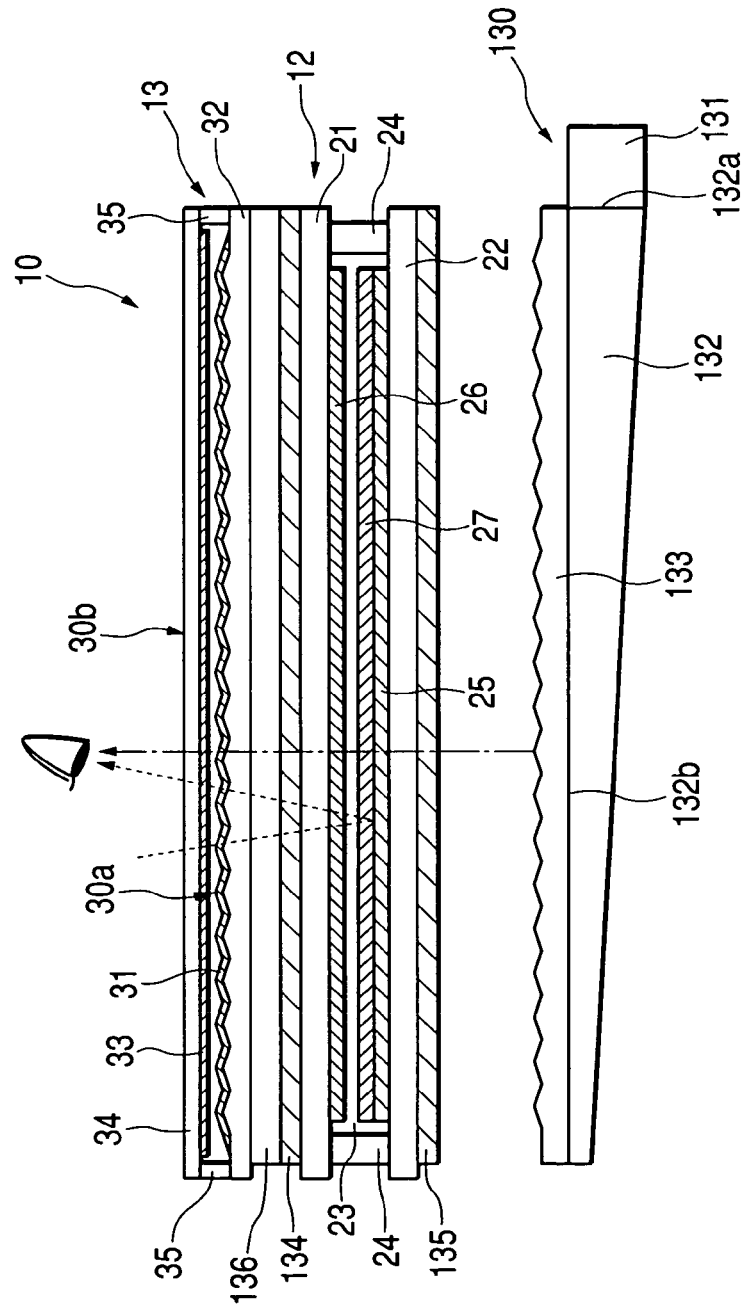
FIG. 15 is a cross-sectional view showing a liquid crystal display device as another embodiment mode of the transparent coordinate input device of the present invention.

In the above embodiment mode, the liquid crystal display device having the front light is explained. However, as shown in FIG. 15, the transparent coordinate input device of the present invention can be also applied to a liquid crystal display device having a back light.

The back light 130 has a light source 131, a light guide plate 132 for introducing light from the light source from a side end face 132a into the interior and emitting this light propagated in the interior from an emitting face 132b, and a lens sheet 133 arranged on the emitting face side of the light guide plate.

The structure of a transmission type or a semi-transmission type is adopted as the liquid crystal display panel so as to transmit the light from the back light toward an observer. Polarizing plates 134, 135 are formed on the observing side face and/or the face of the back light side of the liquid crystal display panel.

The transparent coordinate input device of the present invention and the liquid crystal display panel can be stuck to each other by a double coated tape 136.

As explained above in detail, the ridge portion is formed in a shape longitudinally extending in one direction in accordance with the transparent coordinate input device and the transparent composite material of the present invention. Accordingly, the generation of bright spots due to the microscopic lens effect is restrained and no irregularities of illuminance are caused, and glittering and defocusing can be effectively prevented. The interference fringe generated in the transparent coordinate input device is finely set to such an extent that no interference fringe can be visualized by sufficiently finely setting the pitch of the ridge portion. Accordingly, no existence of the interference fringe is apparently almost recognized.

What is claimed is:

1. A transparent coordinate input device comprising:
a first transparent base material formed over a liquid crystal display panel, having a first transparent resistance film disposed on a face thereof, and disposed between the first transparent resistance film and the liquid crystal display panel; and
a second transparent base material facing said first transparent base material with a clearance therebetween and having a second transparent resistance film disposed on a face thereof opposing said first transparent resistance film;
wherein the first transparent base material is disposed below the second transparent base material, a plurality of ridge portions are formed only on a surface of the first transparent base material that faces the second transparent base material;
wherein the surface of the first transparent resistance film in each section of the ridge portions includes a top portion and first and second slanted faces on corresponding sides of the top portion, wherein the first and second slanted faces are symmetrically in-line with respect to the top portion and defining an obtuse angle;
wherein a height (H) between the top portion of the surface of the first transparent resistance film in each section of the ridge portions and the bottom portion of the surface of the first transparent resistance film ranges from 0.1 µm to 10 µm and is formed over a valley between adjacent ridge portions;
wherein the plurality of ridge portions are transparent, have a polygonal shape in section, are narrow in width, and are formed as projected strips longitudinally extending in one direction, the ridge portions are adjacent to each other and are formed with a predetermined pitch by continuously extending the ridge portions, and the pitch of the top portions of the transparent resistance film formed over the ridge portions ranges from 100 µm to 500 µm and is constant and wherein the polygonal shape of the ridge portions comprises a triangular shape or a triangular shape with a curved top, wherein a vertical angle of the triangular shape or the triangular shape with the curved top in the section of the ridge portion is an obtuse angle;
wherein a lower face of the second transparent base material disposed on an operation side and a lower face of the second transparent resistance film are smooth surfaces and wherein the second base material and the second transparent resistance film are configured to flex toward the first transparent base material based on input received during operation; and
wherein a surface of the first transparent resistance film formed on an upper face of the ridge portions is formed along the projected strips longitudinally extending in the one direction of the ridge portions and has an obtuse vertical angle in each section of the ridge portions, wherein the obtuse vertical angle in each section of the ridge portions is constant.

2. A liquid crystal display device comprising the transparent coordinate input device according to claim 1, and a liquid crystal display panel.

3. The liquid crystal display device according to claim 2, wherein said ridge portion is extended in a direction inclined at a constant angle with respect to each of two perpendicular sides for partitioning a pixel of said liquid crystal display panel.

4. The transparent coordinate input device according to claim 1, wherein an angle of a valley between the ridge portions adjacent to each other in section is an obtuse angle.

5. The transparent coordinate input device according to claim 1, wherein the surface of the first transparent resistance film formed on the upper face between the ridge portions adjacent to each other has an obtuse valley angle in section.

6. The transparent coordinate input device according to claim 1, wherein the first transparent resistance film has a thickness of 0.01 µm to 0.05 µm.

7. The transparent coordinate input device according to claim 1, wherein the second base material and the second transparent resistance film are configured to flex toward the first transparent base material based on input received during operation such that the second transparent resistance film contacts the first transparent resistance film and that an interference fringe is generated on the first and second slanted faces.

* * * * *